July 14, 1931. E. SANDERS 1,814,060
POTATO HARVESTER
Filed Oct. 17, 1930
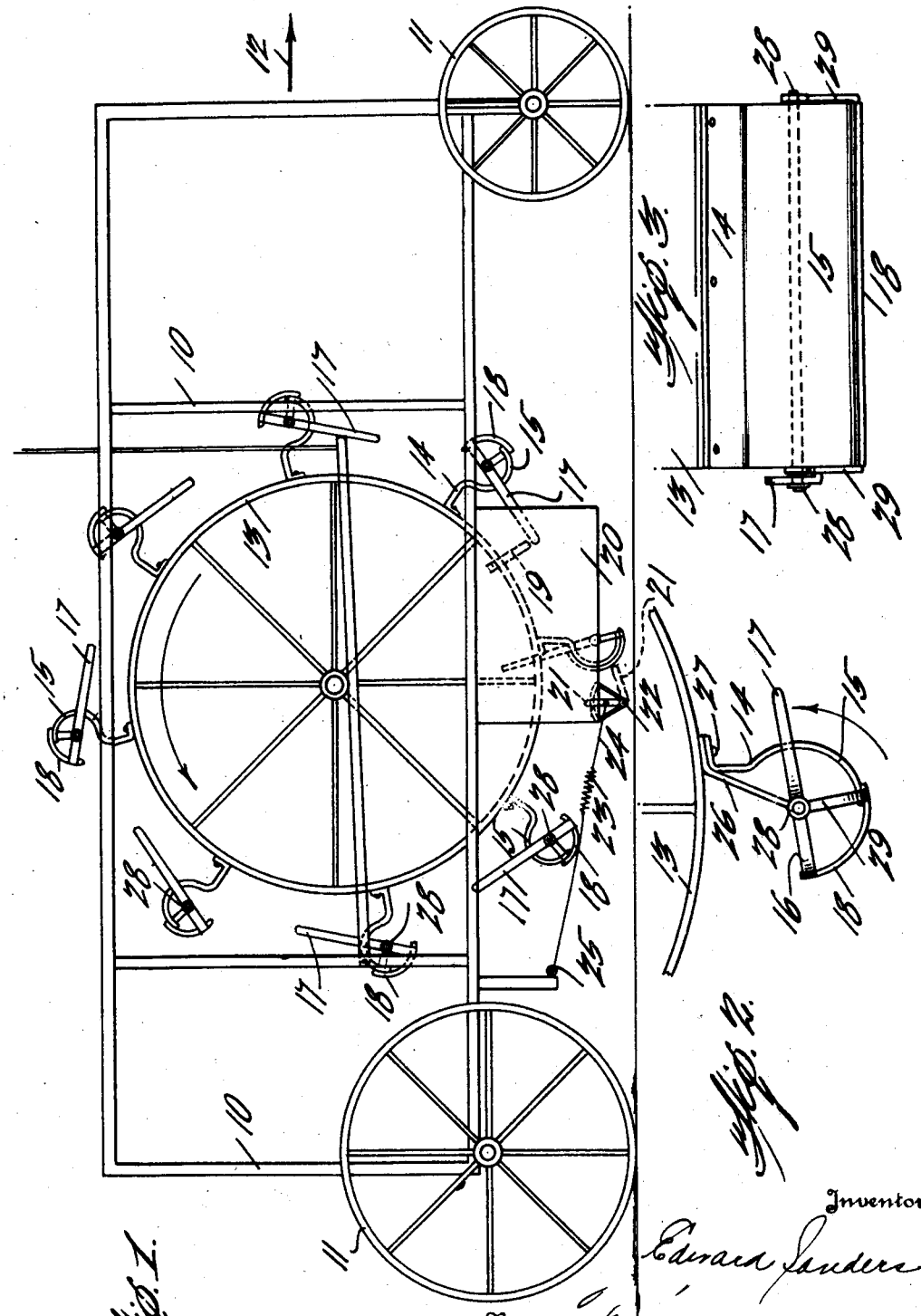

Patented July 14, 1931

1,814,060

UNITED STATES PATENT OFFICE

EDWARD SANDERS, OF MOORHEAD, MINNESOTA

POTATO HARVESTER

Application filed October 17, 1930. Serial No. 489,407.

This invention relates to potato harvesters and the like, and has for an object the provision of novel means for retaining the excavated earth and potatoes while they are being carried from the soil to a location or part of the apparatus which is designed for separating the potatoes from the other deposits which are scooped by the excavating blades as they are carried by a rotating element such as a drum or the like.

The invention is designed as an improvement on the potato harvester of my Patent No. 1,571,344 of February 2d, 1926, and the excavating and carrying instrumentalities are preferably intended to be in associated relation to separators and conveyors of the same or general character of those disclosed in said patent.

It is an object of this invention to provide novel means for preventing the dislodgment of potatoes and excavated material from the scoops or blades prior to their reaching a predetermined location with respect to a conveyor, as stated, and specifically the invention has for an object the provision of guards, one of which is associated with each scoop, novel means being provided for mounting the guards in operative relation to the scoops and for operating the guards in time to set them so that the mouths of the scoops are unguarded, and to thereafter move them to their guarding positions to prevent dislodgment of the deposits.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of that part of a potato harvester which has to do with excavating potatoes and carrying them to a location where they may be deposited in the separating and conveying instrumentalities;

Figure 2 illustrates an enlarged detail view of a fragment of the rotating member with the scoop and guard applied thereto; and Figure 3 illustrates a rear view of the scoop.

In these drawings 10 denotes a frame which may be of any appropriate construction mounted on wheels, such as 11, it being intended that the harvester shall be moved in the direction of the arrow 12, Figure 1. A drum or rotating member 13 is mounted in the frame and it is intended that it shall be geared so that power applied to its shaft will rotate it counter clockwise.

As means for communicating power to this drum is a means well known mechanically, it is believed unnecessary for an understanding of this invention to supply an illustration of power transmitting means. The inventor prefers to utilize the illustration of means of the said patent. A plurality of brackets 14 is secured to the periphery of the drum or rotating member and each bracket is shaped to form a scoop or blade 15 although, obviously, the scoop may constitute a separate part of the apparatus and it could be attached to the bracket or directly to the rotating member, so that the inventor does not wish to be limited with respect to these features. The main purpose of the invention in this respect is that the scoop shall be curved so that as it is forced into the soil during the rotation of the drum, earth and potatoes or other vegetation which is to be harvested will lodge in the concave portion of the scoop and be carried thereby.

In order that the efficiency of this part of the device may be enhanced, a guard is provided for each of the scoops or blades and, to that end, a bracket 16 is supplied for each scoop and an arm 17 is oscillatively mounted on it. One end, or what may be regarded as the outer end of the arm, is connected to a segmental guard 18 which is intended to lie concentric with the scoop when the guard is out of operative position, the said guard being carried by the arm beyond the edge of the scoop to increase the capacity and prevent dislodgment of the excavated contents of the scoop. The inner end of the arm is of such length that it will travel in the path of a trip 19 which is stationary on a plate or depending apron 20 carried by the frame at one end of the scoops as they travel downwardly into the soil and upwardly therefrom.

In Figure 1 it is shown that the successively lowermost scoop and the guard are located to receive deposits as the scoop enters the soil, the guard then being in an inoperative position and as the scoop is carried a distance where it is emerging from the soil, the inner end of the arm strikes the abutment or tripping member 19, causing the arm to swing and to carry the guard to its operative position in which each appears in the other parts of the drawings illustrating the scoop and guard. Obviously, when the loaded scoops reach a predetermined position, the deposits will gravitate from them and it is the purpose of the inventor that gathering or collecting devices shall be arranged in such operative relation to these scoops that the loads which they carry will be deposited on the collecting instrumentalities. As the scoops successively reach the location of a tripping device, the guards are moved to the position in which they are shown in the lowermost scoop in Figure 1. To set the device in this way, an arm 21 has its end pivoted at 22 and it extends upwardly in the path of travel of the open guard so that the said guard is engaged as the drum rotates. The arm 21 is held under tension by a spring 23 interposed in a connection 24 between the said arm and a stationary part 25 of the machine, and the strength of the spring 23 is sufficient to offer a resistance to the movement of the arm 21 to cause the operation of the guards as they successively come into engagement with the arm. The arm is yieldable so that it swings on its pivot as the guard is moved and the guard and the accompanying scoop pass over the end of the arm after it has swung on its pivot, it being understood, of course, that the spring 23 acts to reset the arm in the path of travel of the next succeeding scoop and arm so that as the scoops engage the arm, they are operated as stated.

The scoops are each provided with a plate 26 secured to it by fastenings 27, such as rivets, or the like, and the pivot 28 of the arm is carried by the said plate. The guard is further provided with a brace or stay member 29 secured to the guard at the edge opposite that to which the arm is connected and the said stay or brace is also connected to the stud or pivot 18.

I claim:

1. In a potato harvester, a rotating member, scoops carried thereby, guards pivotally mounted on the scoops for partially closing the mouths thereof, means for imparting motion to the guards for moving them into operative positions, and means for returning them to their inoperative positions during the rotation of the said member.

2. In a potato harvester, a rotating member, scoops carried thereby, curved guards pivotally mounted on the scoops to move concentrically therewith for partially closing the mouths thereof, means for imparting motion to the guards for moving them into operative positions, and means for returning them to their inoperative positions during the rotation of the said member.

3. In a potato harvester, a rotatively mounted member, scoops on the periphery thereof, guards pivotally mounted on the scoops for guarding the mouths of the scoops, an arm rigid with each of the guards and projecting inwardly therefrom, a trip in the path of travel of said arms whereby the guards are swung to operative positions when the arms successively strike the trip, and a tripping device adapted to return the guards to their inoperative positions.

4. In a potato harvester, a rotatively mounted member, scoops on the periphery thereof, guards pivotally mounted on the scoops for guarding the mouths of the scoops, an arm rigid with each of the guards and projecting inwardly therefrom, a trip in the path of travel of the arm whereby the guards are swung to operative positions when the arms strike the trip, a tripping arm pivotally mounted on a fixed portion of the harvester in the path of travel of said guards, and resilient means for holding the pivoted tripping arm in operative position, the said guards being moved from their operative positions to their inoperative positions when contacting the pivoted tripping arm.

EDWARD SANDERS.